United States Patent
Penden

(10) Patent No.: US 11,378,436 B2
(45) Date of Patent: Jul. 5, 2022

(54) ADJUSTABLE LIQUID LEVEL INDICATORS

(71) Applicant: Carrier Corporation, Palm Beach Gardens, FL (US)

(72) Inventor: Karl Fredrik Penden, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/253,497

(22) PCT Filed: Dec. 9, 2019

(86) PCT No.: PCT/US2019/065167
§ 371 (c)(1),
(2) Date: Dec. 17, 2020

(87) PCT Pub. No.: WO2020/123349
PCT Pub. Date: Jun. 18, 2020

(65) Prior Publication Data
US 2021/0270663 A1    Sep. 2, 2021

Related U.S. Application Data

(60) Provisional application No. 62/777,673, filed on Dec. 10, 2018.

(51) Int. Cl.
*G01F 23/74* (2006.01)
*A62C 35/02* (2006.01)

(52) U.S. Cl.
CPC .............. *G01F 23/74* (2013.01); *A62C 35/02* (2013.01)

(58) Field of Classification Search
CPC .................................. G01F 23/74; A62C 35/02
USPC ................................................................ 73/319
See application file for complete search history.

(56) References Cited

U.S. PATENT DOCUMENTS

| | | | | |
|---|---|---|---|---|
| 3,937,083 A | * | 2/1976 | Sabatino | G01F 23/70 73/224 |
| 3,992,941 A | * | 11/1976 | McGoldrick | G01F 23/68 340/623 |
| 4,139,750 A | | 2/1979 | Rau | |
| 4,593,855 A | | 6/1986 | Forsyth | |
| 5,435,181 A | | 7/1995 | Koebernik | |

(Continued)

FOREIGN PATENT DOCUMENTS

| | | |
|---|---|---|
| AU | 5661000 A | 3/2001 |
| CN | 1454685 A | 11/2003 |

(Continued)

OTHER PUBLICATIONS

International Search Report and Written Opinion for International Patent Application No. PCT/US2019/065167 dated Mar. 10, 2020.

(Continued)

*Primary Examiner* — Nathaniel T Woodward
(74) *Attorney, Agent, or Firm* — Carlson, Gaskey & Olds, P.C.

(57) ABSTRACT

A liquid level indicator for a fire suppression system includes a guide. A slide is selectively movable along the guide to a fixed position associated with a fill range. The slide includes a plurality of sense elements configured to indicate a level of liquid.

20 Claims, 5 Drawing Sheets

(56) References Cited

U.S. PATENT DOCUMENTS

| | | | | |
|---|---|---|---|---|
| 5,588,779 | A | * | 12/1996 | Merrett .......... G01F 23/56 405/54 |
| 6,513,378 | B1 | * | 2/2003 | Love, Jr. .......... G01F 23/74 340/623 |
| 2011/0138907 | A1 | * | 6/2011 | Rudd .......... G01F 23/74 73/313 |
| 2015/0355014 | A1 | * | 12/2015 | Deak .......... G01F 23/72 73/313 |

FOREIGN PATENT DOCUMENTS

| | | |
|---|---|---|
| CN | 204671797 U | 9/2015 |
| CN | 206772394 U | 12/2017 |
| DE | 8533754 U1 | 1/1986 |
| DE | 4324919 A1 | 1/1995 |
| DE | 19520799 A1 | 12/1996 |
| EP | 1006219 B1 | 12/2006 |
| EP | 2256469 A1 | 12/2010 |
| EP | 2950060 A1 | 12/2015 |
| EP | 2950060 A1 * 12/2015 .......... G01F 23/74 |
| FR | 2445725 A1 | 8/1980 |
| GB | 476779 A | 12/1937 |
| GB | 512983 A | 10/1939 |
| GB | 801017 A | 9/1958 |
| GB | 1389015 A | 4/1975 |
| GB | 2178238 A | 2/1987 |
| GB | 2178238 A * 2/1987 .......... G01F 23/74 |
| JP | S5879227 A | 5/1983 |
| JP | H11295132 A | 10/1999 |

OTHER PUBLICATIONS

Advanced Fire Protection Solutions for Modern Applications.

* cited by examiner

ADJUSTABLE LIQUID LEVEL INDICATORS

CROSS-REFERENCE TO RELATED APPLICATIONS

This application claims priority to U.S. Provisional Application No. 62/777,673, which was filed on Dec. 10, 2018 and is incorporated herein by reference.

BACKGROUND

This disclosure relates to fire suppression systems, and more particularly liquid level indicators for fire suppression systems.

A "clean agent" fire suppression system extinguishes fires by creating a fire extinguishing atmosphere consisting of agent vapor or gas mixed with the air within the protected space. Clean agent systems may be used in buildings and other such structures and areas to suppress fires without water, powder or foam so not as to destroy or damage an enclosed area of the structure and/or equipment contained therein. Clean agent fire suppressants leave no residue upon evaporation.

SUMMARY

A method for indicating liquid level in a fire suppression cylinder according to an example of the present disclosure includes determining a fill range of the cylinder. The method includes moving a slide along a guide to a fixed location within a zone on the guide corresponding with the fill range. The slide is configured to indicate a liquid level. The method includes inserting the guide into the cylinder, such that the slide is within the fill range. The method includes determining a liquid level. The method includes communicating liquid level information from the guide to a readout.

In a further example according to any of the foregoing examples, the slide includes a plurality of sense elements.

In a further example according to any of the foregoing examples, the sense elements are Hall effect sensors.

In a further example according to any of the foregoing examples, the sense elements are reed switches.

In a further example according to any of the foregoing examples, the guide includes a printed circuit board in electrical communication with the sense elements.

In a further example according to any of the foregoing examples, the inserting step includes providing the guide in a tube carrying a magnetic float, and inserting the tube into the cylinder.

In a further example according to any of the foregoing examples, the moving step is performed before the inserting step.

A liquid level indicator for a fire suppression system according to an example of the present disclosure includes a guide. A slide is selectively movable along the guide to a fixed position associated with a fill range. The slide includes a plurality of sense elements configured to indicate a level of liquid.

In a further example according to any of the foregoing examples, the indicator includes a tube and a magnetic float positioned on the tube. The guide and slide are received within the tube.

In a further example according to any of the foregoing examples, the sense elements are Hall effect sensors.

In a further example according to any of the foregoing examples, the sense elements are reed switches.

In a further example according to any of the foregoing examples, the slide is configured to remain in the fixed position independent of a change in liquid level.

In a further example according to any of the foregoing examples, the guide includes a printed circuit board in electrical communication with the sense elements.

A fire suppression system according to an example of the present disclosure includes a cylinder. A liquid level indicator within the cylinder includes a guide and a slide selectively movable along the guide to a fixed position associated with a fill range of the cylinder. The slide includes a plurality of sense elements configured to indicate a level of liquid.

In a further example according to any of the foregoing examples, the indicator includes a tube and a magnetic float positioned on the tube. The guide and slide are received within the tube.

In a further example according to any of the foregoing examples, the sense elements are Hall effect sensors.

In a further example according to any of the foregoing examples, the sense elements are reed switches.

In a further example according to any of the foregoing examples, the slide remains in the fixed position independent of a change in liquid level of the cylinder.

In a further example according to any of the foregoing examples, the guide includes a printed circuit board in electrical communication with the sense elements.

In a further example according to any of the foregoing examples, the system includes a readout in electrical communication with the printed circuit board.

DETAILED DESCRIPTION

Figure 1:
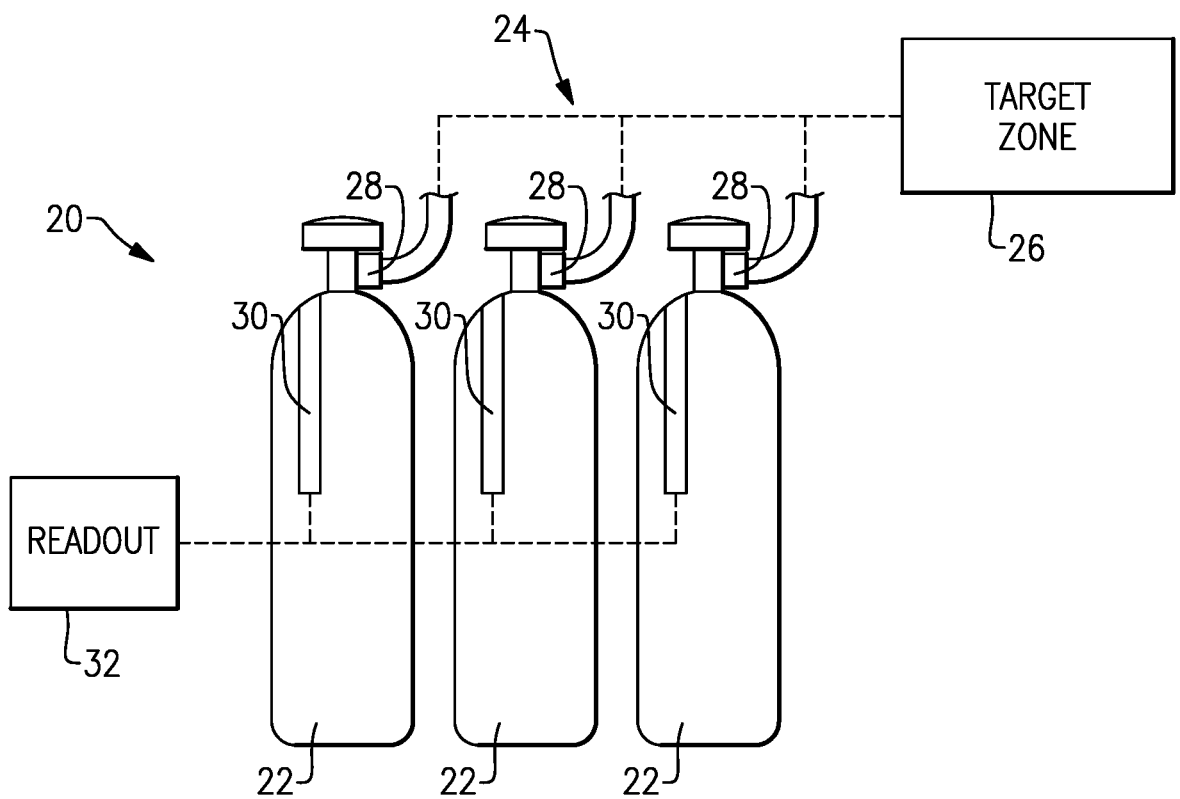
FIG. 1 schematically illustrates an example fire suppression system.

FIG. 1 schematically illustrates an example fire suppression system 20 including cylinders 22 containing agent liquid and configured to suppress fire in a target zone 26 through a distribution network 24. Each cylinder 22 includes a valve 28 to control the flow of agent from the cylinder 22 through the distribution network 24. Although three cylinders 22 are shown in the example system 20, more or fewer cylinders 22 may be utilized in some examples. The example fire suppression system 20 is a clean agent system, but other types of fire suppression systems may also benefit from this disclosure. A clean agent system includes a liquid agent and a separate propellant, such as N2, such that liquid level monitoring is utilized in addition to or alternative to monitoring pressure.

One or more of the cylinders 22 may include a liquid level indicator 30 (shown schematically) for indicating the level of agent liquid in the respective cylinder 22. The liquid level indicator 30 may be in communication with a readout 32 for indicating the level of agent within the respective cylinder 22. Although one readout 32 is shown schematically, in some examples, more than one readout 32 may be utilized, including one readout 32 per cylinder 22 in some examples.

Figure 2:
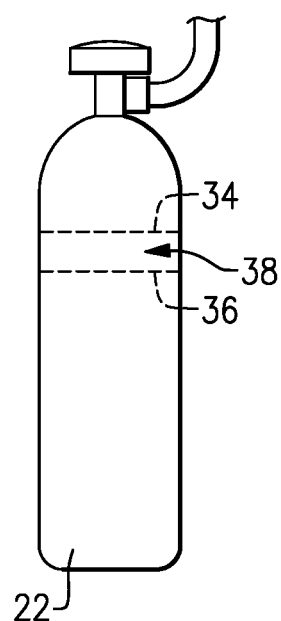
FIG. 2 schematically illustrates an example cylinder of the fire suppression system shown in FIG. 1.

FIG. 2 schematically illustrates a cylinder 22 having an actual fill range 38 extending from a maximum liquid level 34 to a minimum liquid level 36. In some examples, the maximum and minimum fill levels 34, 36 correspond with the maximum and minimum extinguishing agent liquid level of the specific cylinder throughout its allowable temperature range, based on calculations to meet required system performance according to regulations. Example regulations include the National Fire Protection Association (NFPA) codes and standards. A specific cylinder 22 may be filled to a specific level based on the target zone 26 it protects in some examples. The maximum and minimum fill levels 34, 36 may be based on temperature changes, error margins, and/or other tolerances, in some examples.

Figure 3:
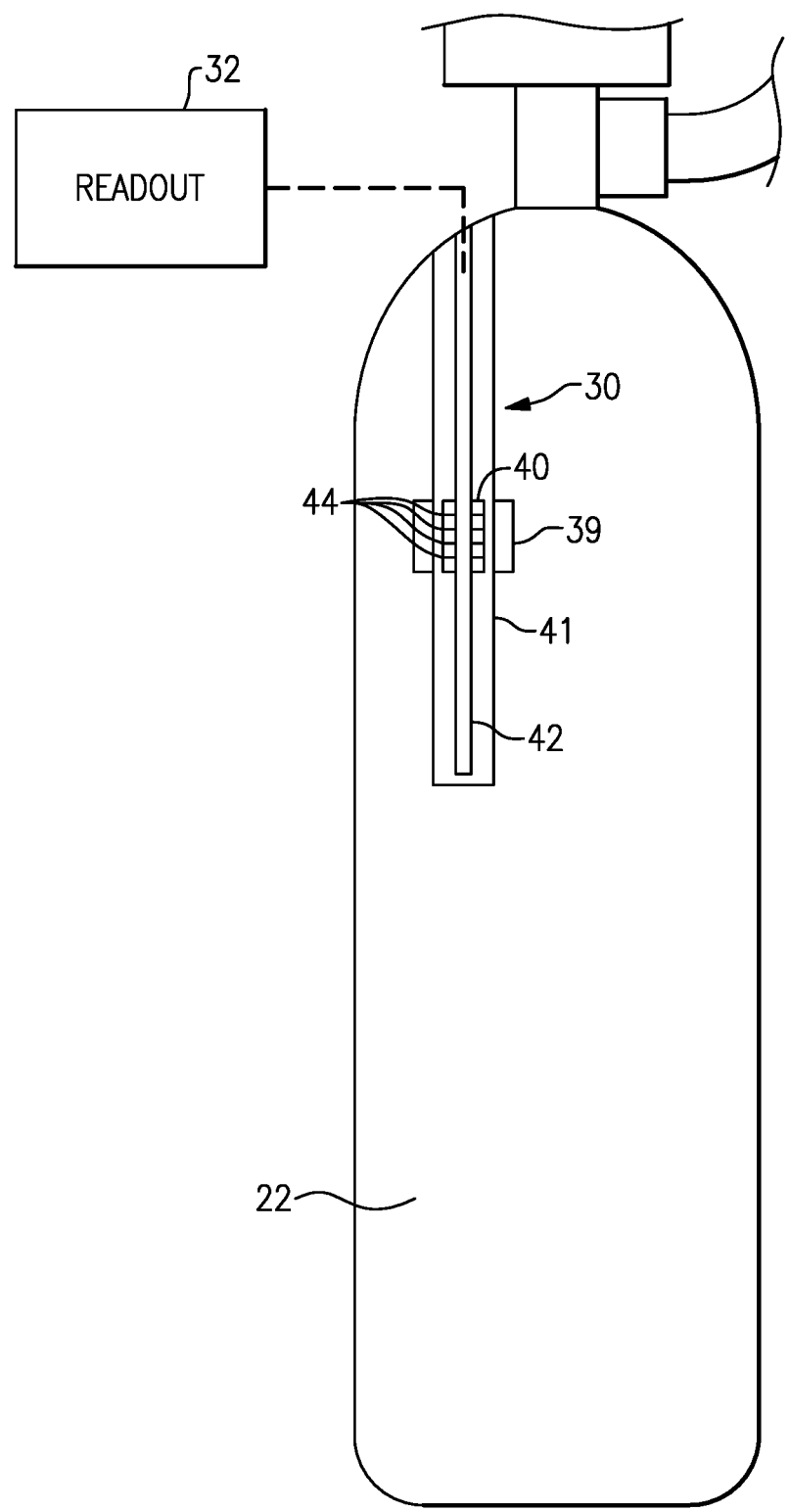
FIG. 3 is a cross sectional view of an example indicator in the cylinder of FIG. 2.

FIG. 3 illustrates a cross section of an example indicator 30 in a cylinder 22. The indicator 30 includes a magnetic float 39 movable along a tube 41. In some examples, the tube 41 is brass, but other materials may be utilized. A slide 40 and an elongated guide 42 are provided within the tube 41 to isolate the slide 40 and guide 42 from contact with the liquid in the cylinder 22. The slide 40 is provided on the guide 42 and includes one or more sense elements 44. The sense elements 44 sense the location of the float 39 to indicate a liquid level within the cylinder 22. In some examples, the sense elements 44 are Hall effect sensors that interact with the magnetic float 39 to indicate liquid level in the cylinder 22. In some examples, the sense elements 44 are reed switches that interact with the magnetic float 39 to indicate liquid level in the cylinder 22.

The example guide 42 includes a printed circuit board with trace elements for electrical communication with the sense elements 44 and readout 32. The example sense elements 44 are arranged in an array along the length of the slide 40. In some examples, the sense elements 44 are spaced apart by about a quarter of an inch along the length of the slide 40. The indicator 30 may extend various lengths of the cylinder 22. In some examples, the indicator 30 and guide 42 extend to a point about halfway down the cylinder 22. The example slide 40 and guide 42 may be removable from the tube 41 for adjustment, as described in further detail below. Some examples may allow for adjustment of the slide 40 without removal from the tube 41.

Figure 4:
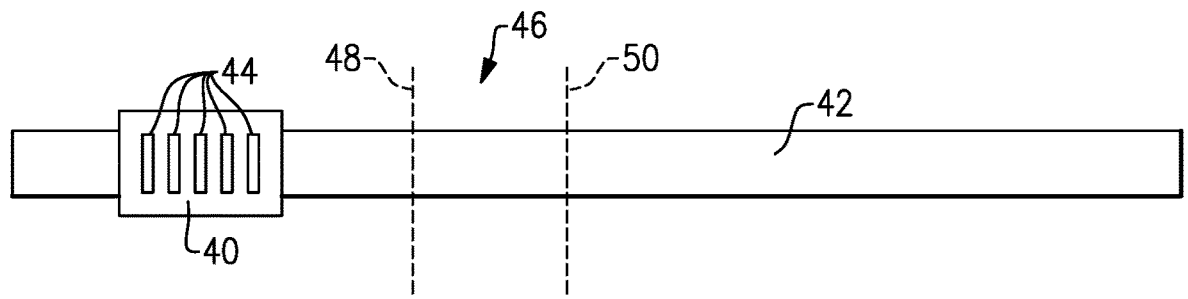
FIG. 4 illustrates a portion of the example indicator of FIG. 3.

FIG. 4 illustrates an example slide 40 and guide 42 of the indicator 30 (shown in FIGS. 1 and 3). The guide 42 may include a zone 46 extending from a first zone end 48 to a second zone end 50. In some examples, the zone 46 is selected such that the zone end 48 is located at the maximum fill level 34 when the guide is placed in the cylinder 22 (see FIG. 2), and the zone end 50 is located at the minimum fill level 36 when the guide 42 is placed in the cylinder 22. The zone 46 of the guide 42 may therefore be selected to correspond with the fill range 38. The example slide 40 is populated with sense elements 44, such that the slide 40 has deposited circuits on it in some examples. In some examples, the slide 40 and guide 42 may be a fiberglass circuit board material. Other materials, including other printed circuit board materials and plastic materials, may be utilized in some examples.

Figure 5:
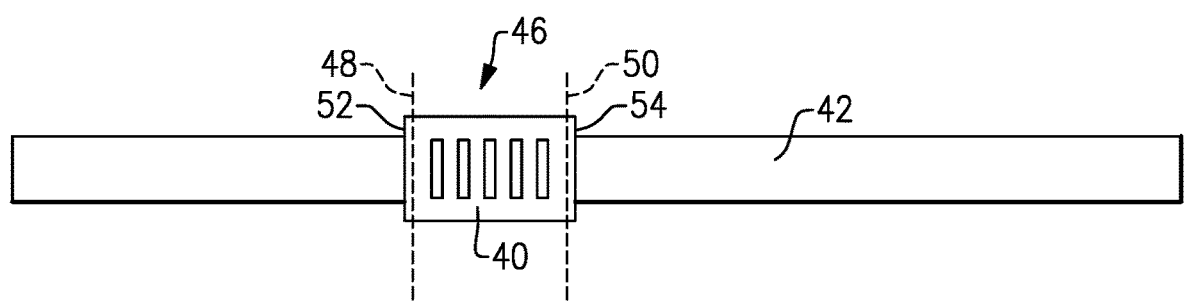
FIG. 5 illustrates the portion of the example indicator shown in FIG. 4.

As illustrated in FIG. 5, the slide 40 is adjustable, such that it can be moved to a fixed location within the zone 46. The slide 40 is selectively adjustable to a fixed location within a target zone. In some examples, the first end 52 of the slide 40 extends outward of the zone 46 beyond the first end 48, and the second end 54 of the slide 40 extends outward of the zone 46 beyond the second end 50. The length of the array of sense elements 44 on the slide 40 may be equal to or greater than the length from the end 48 to the end 50 of the zone 46 in some examples, such that the sense elements 44 cover the entire zone 46. The length of the slide 40 from the end 52 to the end 54 is less than the elongated length of the guide 42. In one example, the length of the slide 40 from the end 52 to the end 54 is about 5 inches, and the elongated length of the guide 42 is about 20 inches. In some examples, the slide 40 is movable along substantially the whole length of the guide 42.

The example slide 40 may be fixed in the selected zone 46 in a number of ways, including one or more of a snap-fit, screws or other fasteners, and adhesive, (not shown) in some examples.

Figure 6:
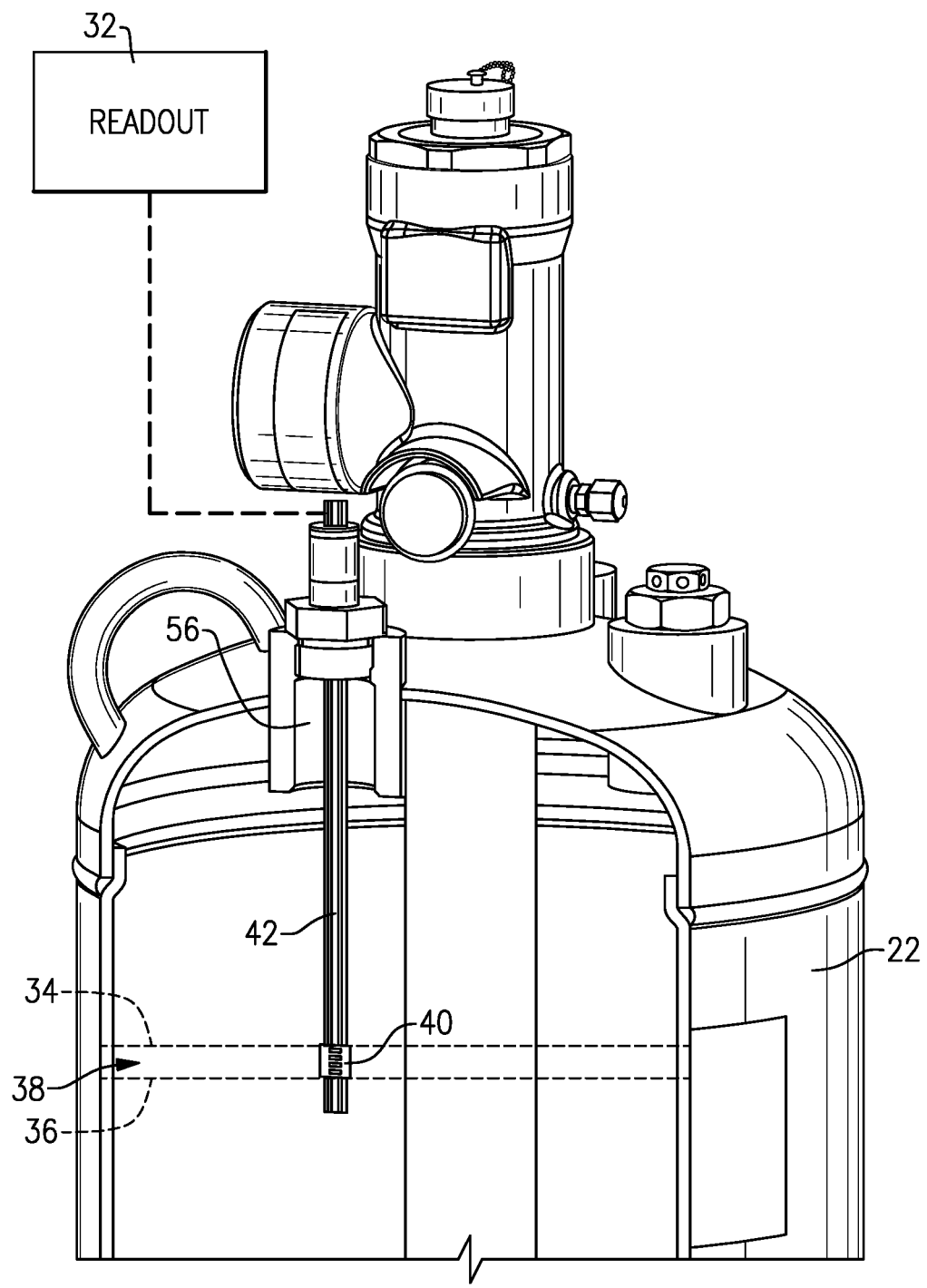
FIG. 6 illustrates an example cylinder with the portion of the example indicator shown in FIGS. 4 and 5.

FIG. 6 illustrates the example slide 40 and guide 42 of an indicator 30 (illustrated schematically in FIGS. 1 and 3) with the float 39 and tube 41 omitted for ease of viewing. After the slide 40 is placed at its fixed location shown in FIG. 4, the indicator 30 (including the float 39 and tube 41 which are not shown) is placed in the cylinder 22 through a port 56. The slide 40 may be adjusted while inside the cylinder 22 in other examples. The slide 40 is therefore located to cover the fill range 38 between the maximum fill level 34 and minimum fill level 36. The slide 40 remains in the fixed position independent of a change in liquid level in the cylinder.

The sense elements 44 of the slide 40 provide an analog output to provide continuous level readings to the readout 32. In some examples, note may be taken where the slide 40 is affixed on the guide 42 and programmed into the readout 32, such that an absolute level reading of the level in the cylinder 22 may be provided on the readout 32. The guide 42 may include level marks indicative of the associated level in the cylinder 22 in some examples, such that the level marks may be referenced when fixing the slide 40 during installation or adjustment. Alternatively or additionally, the readout 32 may provide a relative level reading indicative of the level change along the slide 42. In some examples, the readout 32 includes a display for displaying liquid level information. Alternatively or additionally, the readout 32 may communicate information, such as liquid level information, to other devices or platforms. In some examples, the other devices or platforms may include phones, tablets, other handheld personal devices, computing devices, or cloud platforms. In some examples, readouts 32 from multiple cylinders 22 communicate with a central hub, which may then be accessed by other devices. Communication may be wired or wireless, including via Bluetooth in some examples.

In some examples, the cylinder 22 may be filled to a specific level in the fill range 38 based on the target zone 26 it protects. The length of the guide 42 and slide 40 may be determined based on fluctuations in actual liquid level as a result of temperature changes, filling error margins, and other tolerances in some examples.

In an example, a cylinder 22 can be filled to between 10-50 inches (25.4-127 cm) from its top. For a specific hazard, three of these cylinders 22 are banked together, with each cylinder filled to the 30 inch (76.2 cm) level. The slide 40 is fixed to be centered at the 30 inch level for those three cylinders 22 before they get filled. During cold days, the liquid will contract to 32 inches (81.28 cm) from the top and during warm days it will expand to 28 inches (71.12 cm) from the top. The slide 40 length therefore would include at least 4 inches (10.16 cm) of length of sense elements 44 to accurately read the fluctuations. The length of the slide 40 may therefore be designed to accommodate level variations that occur in a given cylinder 22. Other example lengths and arrangements are contemplated.

For a given clean agent cylinder, the actual fill level is well defined. While the level may fluctuate mildly with temperature it only varies within a small portion of the full allowable fill range. The example indicator 30 focuses the sense elements 44 within that range, reducing the number of sensing elements needed relative to prior art systems by providing a slide 40 adjustable to be moved to and fixed within the zone.

Figure 7:
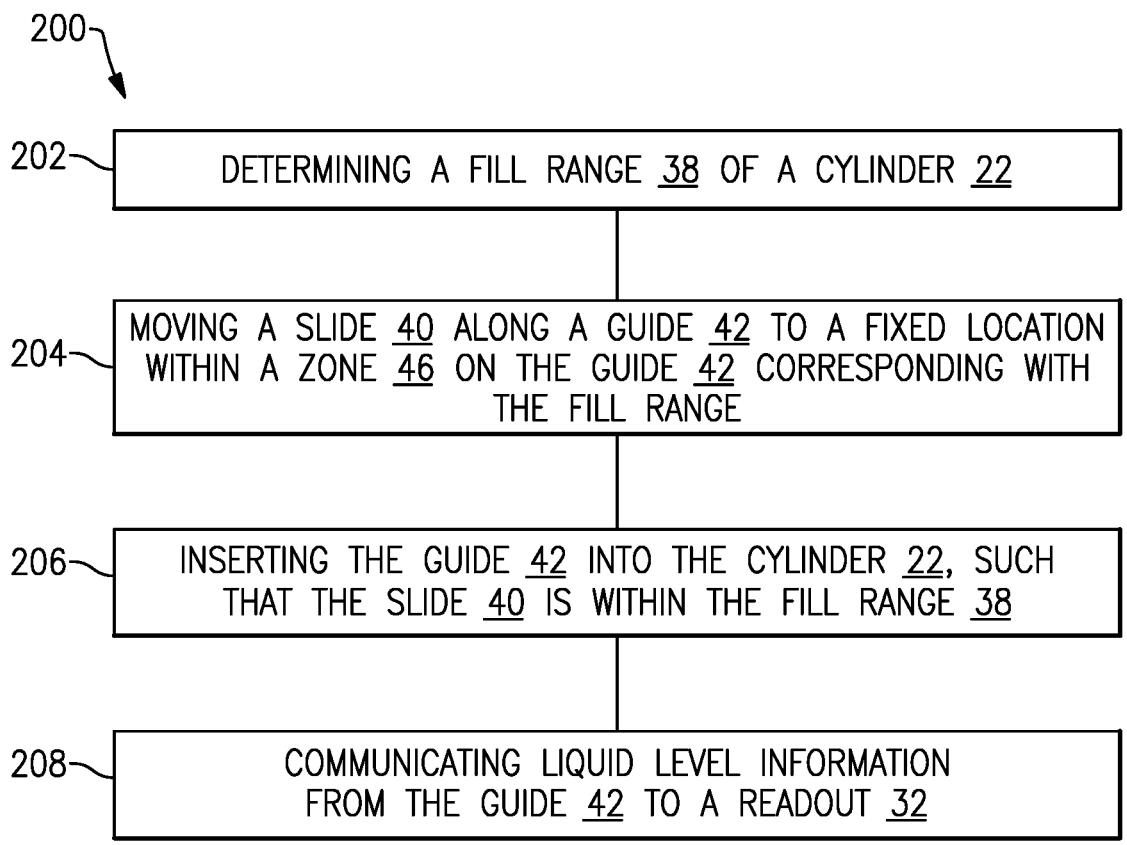
FIG. 7 illustrates a flow chart for a method for indicating liquid level in a fire suppression cylinder.

FIG. 7 illustrates a flow chart for a method 200 for indicating liquid level in a fire suppression cylinder that may be utilized with one or more of the examples disclosed, including the examples shown in FIGS. 1-6 and described above, for which common reference numerals are used below. At 202, the method 200 includes determining a fill range 38 of the cylinder 22. In some examples, this determination is made based on maximum and minimum fill levels 34, 36 as described above and shown in FIG. 2. At 204, the method 200 includes moving a slide 40 along a guide 42 to a fixed location within a zone 46 on the guide 42 corresponding with the fill range 38 as described above with reference to FIGS. 2-6. At 206, the method 200 includes inserting the guide 42 into the cylinder 22, such that the slide 40 is within the fill range 38. In some examples, the guide 42 is inserted through a port 56 of the cylinder 22, as described above and shown in FIG. 6. Once the guide 42 is inserted into the cylinder 22, based on information received by sense elements 44 the guide 42 may determine a liquid level within the fill range 38, or deviation outside of the fill range 38. At 208, the method 200 includes communicating information from the guide 42 to a readout 32, such as the readout 32 shown in FIG. 6 and/or described above in some examples.

Although the different embodiments and examples have the specific components shown in the illustrations, embodiments of this disclosure are not limited to those particular combinations. It is possible to use some of the components or features from one of the embodiments and examples in combination with features or components from another one of the embodiments and examples.

The foregoing description is exemplary rather than defined by the limitations within. Various embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method for indicating liquid level in a fire suppression cylinder, the method comprising:
   determining a fill range of the cylinder;
   moving a slide along a guide to a fixed location within a zone on the guide corresponding with the fill range, wherein the slide is configured to indicate a liquid level;
   inserting the guide into the cylinder, such that the slide is within the fill range;
   determining a liquid level; and
   communicating liquid level information from the guide to a readout.

2. The method as recited in claim 1, wherein the slide includes a plurality of sense elements.

3. The method as recited in claim 2, wherein the sense elements are Hall effect sensors.

4. The method as recited in claim 2, wherein the sense elements are reed switches.

5. The method as recited in claim 2, wherein the guide includes a printed circuit board in electrical communication with the sense elements.

6. The method as recited in claim 2, wherein the fill range includes a maximum fill level and a minimum fill level, the zone includes a first zone end and a second zone end, the first zone end is aligned with the maximum fill level during the moving step, the second zone end is aligned with the minimum fill level after the inserting step, the length of the plurality of sense elements is greater than or equal to the length from the first zone end or the second zone end, and the slide elements cover the zone.

7. The method as recited in claim 1, wherein the inserting step includes providing the guide in a tube carrying a magnetic float, and inserting the tube into the cylinder.

8. The method as recited in claim 1, wherein the moving step is performed before the inserting step.

9. A liquid level indicator for a fire suppression system, comprising:
   a guide;
   a slide selectively movable along the guide to a fixed position associated with a fill range, the slide including a plurality of sense elements configured to indicate a level of liquid;
   a tube; and
   a magnetic float positioned on the tube, wherein the guide and slide are received within the tube.

10. The liquid level indicator as recited in claim 9, wherein the sense elements are Hall effect sensors.

11. The liquid level indicator as recited in claim 9, wherein the sense elements are reed switches.

12. The liquid level indicator as recited in claim 9, wherein the slide is configured to remain in the fixed position independent of a change in liquid level.

13. The liquid level indicator as recited in claim 9, wherein the guide includes a printed circuit board in electrical communication with the sense elements.

14. The liquid level indicator as recited in claim 9, wherein the guide has an elongated first length, the slide has a second length from a first slide end to a second slide end and parallel with the first length, and the first length is greater than the second length.

15. A fire suppression system, comprising:
   a cylinder; and
   a liquid level indicator within the cylinder including:
      a guide;
      a slide selectively movable along the guide to a fixed position associated with a fill range of the cylinder, the slide including a plurality of sense elements configured to indicate a level of liquid;
      a tube; and
      a magnetic float positioned on the tube, wherein the guide and slide are received within the tube.

16. The fire suppression system as recited in claim 15, wherein the sense elements are Hall effect sensors.

17. The fire suppression system as recited in claim 15, wherein the sense elements are reed switches.

18. The fire suppression system as recited in claim 15, wherein the slide is configured to remain in the fixed position independent of a change in liquid level of the cylinder.

19. The fire suppression system as recited in claim 15, wherein the guide includes a printed circuit board in electrical communication with the sense elements.

20. The fire suppression system as recited in claim 19, comprising a readout in electrical communication with the printed circuit board.

\* \* \* \* \*